United States Patent
Wu et al.

(10) Patent No.: US 11,177,920 B2
(45) Date of Patent: Nov. 16, 2021

(54) RESOURCE INDICATION METHOD, AND RELATED DEVICE AND SYSTEM

(71) Applicant: Huawei Technologies Co., Ltd., Shenzhen (CN)

(72) Inventors: Lu Wu, Shenzhen (CN); Yong Liu, Shanghai (CN)

(73) Assignee: Huawei Technologies Co., Ltd., Shenzhen (CN)

(*) Notice: Subject to any disclaimer, the term of this patent is extended or adjusted under 35 U.S.C. 154(b) by 190 days.

(21) Appl. No.: 16/400,784

(22) Filed: May 1, 2019

(65) Prior Publication Data

US 2019/0260527 A1    Aug. 22, 2019

Related U.S. Application Data

(63) Continuation of application No. PCT/CN2017/101926, filed on Sep. 15, 2017.

(30) Foreign Application Priority Data

Nov. 3, 2016 (CN) .......................... 201610959337.4

(51) Int. Cl.
*H04L 5/00* (2006.01)
*H04L 12/915* (2013.01)
(Continued)

(52) U.S. Cl.
CPC ............... *H04L 5/005* (2013.01); *H04L 5/00* (2013.01); *H04L 5/0005* (2013.01);
(Continued)

(58) Field of Classification Search
CPC ..... H04B 7/0695; H04B 7/0626; H04L 5/005; H04L 5/0053; H04L 5/0051; H04L 25/02;
(Continued)

(56) References Cited

U.S. PATENT DOCUMENTS

| | | |
|---|---|---|
| 2009/0207784 A1 | 8/2009 | Lee et al. |
| 2014/0126510 A1 | 5/2014 | Ogawa et al. |

(Continued)

FOREIGN PATENT DOCUMENTS

| | | |
|---|---|---|
| CN | 101635950 A | 1/2010 |
| CN | 102438312 A | 5/2012 |

(Continued)

OTHER PUBLICATIONS

Ericsson et al., "WF on CSI-RS pooling", 3GPP TSG RAN1 #86bis, R1-1610705, Lisbon, Portugal, Oct. 10-14, 2016, 2 pages.

*Primary Examiner* — Vinncelas Louis
(74) *Attorney, Agent, or Firm* — Leydig, Voit & Mayer, Ltd.

(57) ABSTRACT

This application discloses a resource indication method, and a related device and system. The method includes: generating resource indication information, where the resource indication information is used to indicate a reference signal resource allocated to a terminal device in a reference signal resource group in which the terminal device is located among a plurality of reference signal resource groups; and sending the resource indication information. According to the foregoing solution, flexibility of configuring the reference signal resource can be improved, so that better resource sharing is implemented and resource overheads are reduced.

19 Claims, 4 Drawing Sheets

(51) Int. Cl.
  *H04L 12/911* (2013.01)
  *H04L 25/02* (2006.01)
  *H04W 72/04* (2009.01)

(52) U.S. Cl.
  CPC .......... *H04L 5/0048* (2013.01); *H04L 5/0051* (2013.01); *H04L 5/0053* (2013.01); *H04L 25/02* (2013.01); *H04L 47/786* (2013.01); *H04L 47/821* (2013.01); *H04W 72/04* (2013.01)

(58) Field of Classification Search
  CPC ....... H04L 5/0048; H04L 5/00; H04L 5/0005; H04L 47/786; H04L 47/821; H04L 5/0091; H04L 25/0202; H04L 27/2666; H04W 72/04; H04W 72/042; H04W 76/15
  See application file for complete search history.

(56) References Cited

U.S. PATENT DOCUMENTS

| | | | |
|---|---|---|---|
| 2016/0174093 A1 | 6/2016 | Zhou et al. | |
| 2016/0301511 A1* | 10/2016 | Yoon | H04B 7/0626 |
| 2018/0049261 A1* | 2/2018 | Tenny | H04W 76/15 |
| 2018/0115355 A1* | 4/2018 | Nagata | H04B 7/0695 |
| 2019/0173721 A1* | 6/2019 | Gao | H04L 27/2666 |

FOREIGN PATENT DOCUMENTS

| | | |
|---|---|---|
| CN | 103781092 A | 5/2014 |
| EP | 2916479 A1 | 9/2015 |
| EP | 2975899 A1 | 1/2016 |

* cited by examiner

RESOURCE INDICATION METHOD, AND RELATED DEVICE AND SYSTEM

CROSS-REFERENCE TO RELATED APPLICATIONS

This application is a continuation of International Application No. PCT/CN2017/101926, filed on Sep. 15, 2017, which claims priority to Chinese Patent Application No. 201610959337.4, filed on Nov. 3, 2016. The disclosures of the aforementioned applications are hereby incorporated by reference in their entireties.

TECHNICAL FIELD

This application relates to the field of communications technologies, and in particular, to a resource indication method, and a related device and system.

BACKGROUND

In numerous solutions of 5G New Radio (New Radio, NR), a massive multiple-input multiple-output (Massive MIMO (Multi-input Multi-output)) technology that can significantly improve a system capacity is still used as a key technology, to satisfy a high-speed transmission requirement of the NR. The technology uses a resource in a spatial dimension to enable a signal to obtain an array gain, multiplexing and diversity gains, and an interference cancellation gain in space without increasing system bandwidth, thereby multiplying a capacity and spectral efficiency of a communications system.

In the communications system, in order to send and receive data, obtain system synchronization, and feed back channel information, it is relatively necessary to estimate an uplink channel or a downlink channel. Channel estimation is a process of reconstructing or recovering a received signal to compensate for signal distortion caused by channel fading and fading that is caused by noise. In the process, a benchmark signal known to a transmitter and a receiver in advance is used to track a time domain change and a frequency domain change of a channel. The benchmark signal is also referred to as a pilot signal or a reference signal (RS). The reference signal is distributed on different resource elements (RE) in time-frequency two-dimensional space in an OFDM (orthogonal frequency division multiplexing) symbol, and has a known amplitude and phase. In a MIMO system, each transmit antenna port (a virtual antenna or a physical antenna) has an independent channel. Based on the known reference signal, the receiver performs channel estimation for each transmit antenna port, and uses an estimation result to perform scheduling, link adaptation, and transmission configuration information generation related to MIMO transmission. For example, in uplink and downlink, in order to implement channel quality measurement of a multi-antenna system, an LTE-A system separately defines a plurality of pilot symbols: a CSI-RS (channel state information-reference signal), a DMRS (demodulation reference signal), and an SRS (Sounding Reference Signal). The DMRS is used to assist a PDSCH (physical downlink shared channel) in demodulation. The CSI-RS is used for channel measurement corresponding to the antenna port, and the reference signal is introduced to R10 for measuring channel state information in a TM (transmission scheme) 9/10 mode, and further for scheduling, link adaptation, transmission configuration information generation related to MIMO transmission, and the like. In an uplink channel measurement process, a BS (base station) estimates the uplink channel by using a received SRS, and can perform, based on the information, frequency-selective resource scheduling, power control, timing estimation and modulation/coding scheme order selection, downlink precoding generation in TDD, and the like.

The following uses the CSI-RS as an example to describe a problem in the prior art. In real life, a terminal device is usually in a moving state, and therefore, an environment in which the terminal device is located may frequently change. However, a CSI-RS resource of the terminal device keeps unchanged for a long time once being configured, and cannot adapt to the environment change. It may be learned that an existing CSI-RS allocation manner is not flexible enough.

SUMMARY

This application provides a resource indication method, and a related device and system, to improve flexibility of configuring a reference signal resource.

According to a first aspect, a resource indication method applied to a network device side is provided, and the method may include: generating resource indication information, where the resource indication information is used to indicate a reference signal resource allocated to a terminal device in a reference signal resource group in which the terminal device is located among a plurality of reference signal resource groups; and then sending the resource indication information to the terminal device.

According to a second aspect, a resource indication method applied to a terminal device side is provided, and the method may include: receiving resource indication information sent by a network device, where the resource indication information is used to indicate a reference signal resource allocated to a terminal device in a reference signal resource group in which the terminal device is located among a plurality of reference signal resource groups; and then determining, based on the resource indication information, the reference signal resource allocated to the terminal device.

In this application, each resource group includes at least one reference signal resource, and each resource group may be shared by at least one terminal device. The terminal device may perform resource switching between resource groups, or may perform resource switching within the resource group.

In this application, the reference signal resource groups may be grouped according to different principles. For example, different reference signal resource groups may be allocated to different TRPs, or different reference signal resource groups may be allocated to TRPs in different areas (in other words, a plurality of TRPs located in a same area correspond to a same reference signal resource group). In an actual application, the reference signal resource group may alternatively be allocated based on a frequency of a TRP. For example, a reference signal resource group corresponding to a high-frequency TRP is different from a reference signal resource group corresponding to a low-frequency TRP. This is not limited herein. In addition, the foregoing principles may further be combined with each other.

In this application, each reference signal resource group in the plurality of reference signal resource groups may correspond to at least one TRP set, or correspond to at least one TRP. In other words, each resource group is shared by a terminal device served by at least one TRP set (or at least one TRP). Therefore, each TRP or TRP set is associated with one reference signal resource group. When the TRP or TRP set provides a service for the terminal device, a used reference signal is determined based on the associated reference signal resource group.

In this application, the reference signal resource may include but is not limited to at least one of the following resources: a time-frequency resource, a port resource, a sequence resource, and a multiplexing code resource. A resource may be represented by a resource set. For example, the time-frequency resource may be represented as a set $\{P_1, P_2, P_3, P_4\}$ (P represents a resource mapping pattern), and the port resource may be represented as a set $\{1, 2, 3, 4\}$ (1, 2, 3, and 4 respectively represent four antenna ports).

According to the resource indication methods described in the first aspect and the second aspect, the terminal device may perform resource switching between resource groups or within the resource group, and therefore, the plurality of resource groups can implement better resource sharing, thereby improving resource configuration flexibility.

With reference to the first aspect or the second aspect, in a specific implementation, the resource indication information in this application may be a resource value or a resource index, or a combination of a resource value and a resource index. In a specific implementation, when the reference signal resource allocated to the terminal device includes a plurality of resources, some resources may be indicated by using resource values, and the other resources may be indicated by using resource indexes. In addition, all resources may be indicated by using resource values, or may be indicated by using resource indexes.

With reference to the first aspect or the second aspect, in a possible implementation, the resource indication information may include two parts of content: indication information of the reference signal resource group in which the terminal device is located and indication information of the specific reference signal resource allocated to the terminal device. To be specific, the network device may indicate, in a same piece of signaling, both the reference signal resource group in which the terminal device is located and the reference signal resource allocated to the terminal device in the reference signal resource group in which the terminal device is located.

With reference to the first aspect or the second aspect, in another possible implementation, the resource indication information may include indication information of the specific reference signal resource allocated to the terminal device. In addition, the network device may further generate indication information of the reference signal resource group, and send the indication information of the reference signal resource group to the terminal device. The indication information of the reference signal resource group is used to indicate the reference signal resource group in which the terminal device is located. Correspondingly, the terminal device may receive the indication information of the reference signal resource group, and determine, based on the indication information of the reference signal resource group, the reference signal resource group in which the terminal device is located. To be specific, the network device may separately indicate, in two pieces of signaling, a CSI-RS resource group in which the terminal device is located and a CSI-RS resource allocated to the terminal device in the CSI-RS resource group in which the terminal device is located.

With reference to the first aspect or the second aspect, in some possible implementations, the network device may further generate resource configuration information, and send the resource configuration information to the terminal device. The resource configuration information may be used to identify each reference signal resource of each reference signal resource group in the plurality of reference signal resource groups. Correspondingly, the terminal device may receive the resource configuration information, and determine, based on the resource configuration information, each reference signal resource of each reference signal resource group in the plurality of reference signal resource groups.

In an implementation, the resource configuration information may include identification information of each resource group in the plurality of reference signal resource groups, and resource sets corresponding to various resources in each resource group, for example, an antenna port set, a signal sequence set, a resource mapping pattern set, and a multiplexing code set.

In another implementation, the resource configuration information may include identification information of each resource group in the plurality of reference signal resource groups and a plurality of preset combinations formed by various resources. The resource configuration information may further include a resource index corresponding to each preset combination.

In a specific implementation, the network device may send the resource configuration information to the terminal device in, but not limited to, the following manners.

In an implementation, when the terminal device is connected to the network device, the network device may deliver the resource configuration information to the terminal device. An application scenario corresponding to this implementation may include: Once the terminal device moves and is connected to a new transceiver point, the new transceiver point delivers the resource configuration information to the terminal device.

In another implementation, the network device may periodically send the resource configuration information to the terminal device by using static signaling such as RRC signaling, to indicate resources included in the plurality of reference signal resource groups within a relatively long signaling period.

In still another implementation, the network device may broadcast the resource configuration information by using a fixed period. A terminal device on which resource configuration has not been performed completes the resource configuration when sensing the broadcast.

In yet another implementation, when the terminal device accesses a communications network, an access network device of the communications network sends the resource configuration information to the terminal device.

In an actual application, the network device may alternatively deliver the resource configuration information to the terminal device in another manner, for example, by using MAC layer indication information (such as a MAC CE) or physical layer indication information (such as DCI). This is not limited in this application.

With reference to the first aspect or the second aspect, in some possible implementations, each of the foregoing various indication information (including the indication information of the reference signal resource, the indication information of the reference signal resource group, and configuration information of the reference signal resource) may be sent by using RRC layer signaling, or MAC layer signaling, or physical layer signaling.

According to a third aspect, a network apparatus is provided. The network apparatus may include: a transceiver, a processor, and a memory, where the memory is configured to store a program and data, and the processor invokes the program in the memory to perform the resource indication method described in any implementation of the first aspect.

According to a fourth aspect, a terminal device is provided. The terminal device may include: a receiver, a processor, and a memory, where the memory is configured to store a program and data, and the processor invokes the program in the memory to perform the resource indication method described in any implementation of the second aspect.

According to a fifth aspect, a network apparatus is provided. The network apparatus may include a functional unit for performing the resource indication method described in the first aspect.

According to a sixth aspect, a terminal device is provided. The terminal device may include a functional unit for performing the resource indication method described in the second aspect.

According to a seventh aspect, a computer program product is provided, including a computer readable storage medium. The computer readable storage medium stores a computer program instruction, and when the computer program instruction runs on a computer, the steps described in the method of the first aspect are performed.

According to an eighth aspect, a computer program product is provided, including a computer readable storage medium. The computer readable storage medium stores a computer program instruction, and when the computer program instruction runs on a computer, the steps described in the method of the second aspect are performed.

According to a ninth aspect, a communications system is provided, including: a network apparatus and a terminal device, where the network apparatus may be the network apparatus described in the third aspect, and the terminal device may be the terminal device described in the fourth aspect.

In some embodiments, the network apparatus may be the network apparatus described in the fifth aspect, and the terminal device may be the terminal device described in the sixth aspect.

It should be noted that the network apparatus may alternatively be the network device described in all the foregoing content, and the terminal device may be the terminal device described in all the foregoing content.

According to the technical solutions provided in this application, flexibility of configuring the reference signal resource can be improved, so that better resource sharing can be implemented and resource overheads can be reduced. Intra-group or inter-group resources are properly configured, so that inter-user interference may further be reduced, and channel estimation performance is improved.

BRIEF DESCRIPTION OF DRAWINGS

To describe the technical solutions in this application or the background more clearly, the following describes the accompanying drawings required by this application or the background.

DESCRIPTION OF EMBODIMENTS

Terms used in the embodiment part of this application are only used to explain specific embodiments of this application, but are not intended to limit this application.

Figure 1:
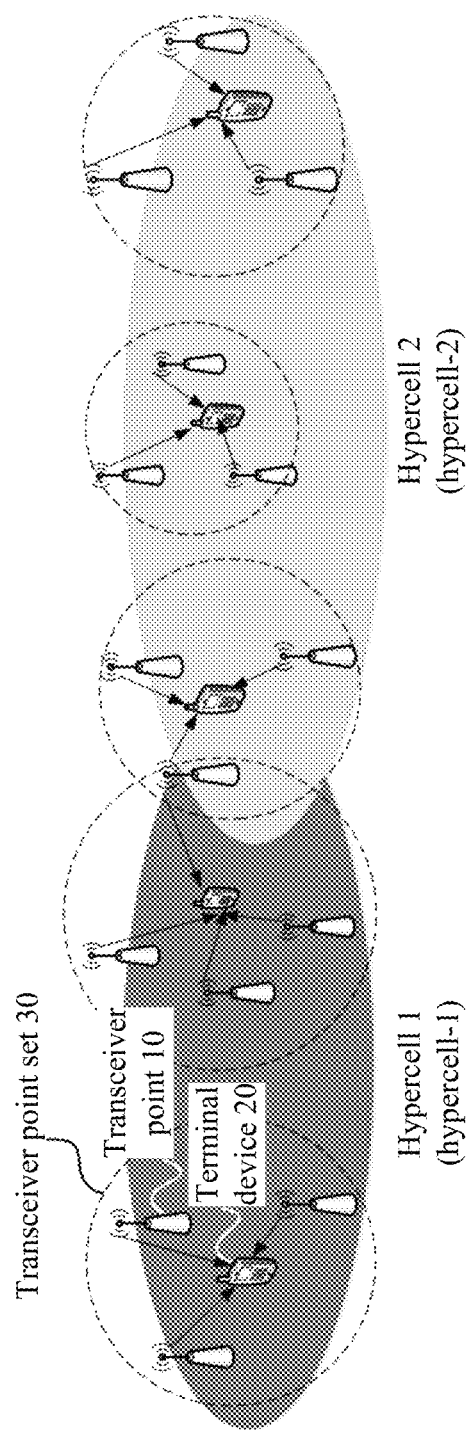
FIG. 1 is a schematic diagram of an application scenario according to this application.

FIG. 1 is a schematic diagram of an application scenario according to this application. FIG. 1 shows a hypercell formed by high-density transceiver points (TRP). As shown in FIG. 1, in a high-density TRP transmission scenario, a terminal device 20 may communicate with a plurality of transceiver points 10, to form a terminal device centric communications system (UE-cell-center-like). Generally, a plurality of transceiver points adjacent in location may be grouped into one set, to form a set of transceiver points indicated by a dashed circle in the accompanying drawing, which may be referred to as a TRP set. It should be noted that a division manner of the TRP set is not limited to a division manner depending on a location, and may be another division manner. For example, TRPs with strong correlation are grouped into one set. This is not limited in this application.

In a specific implementation, the transceiver point 10 may be a base transceiver station (BTS) in a GSM system or a CDMA system, or may be a NodeB in a WCDMA system, or may be an evolved NodeB (eNB or eNodeB) in an LTE system, or a network device such as a base station or a micro base station in a future 5G network. This is not limited in this application.

In a specific implementation, the terminal device 20 may support coordinated multipoint transmission (CoMP). In other words, the terminal device 20 may communicate with two or more transceiver points 10 in the accompanying drawing. The terminal device 20 may be referred to as an access terminal, a terminal device, a subscriber unit, a subscriber station, a mobile station, a mobile console, a remote station, a remote terminal, a mobile device, a user terminal, a terminal, a wireless communications device, a user agent, or a user apparatus. In a specific implementation, the terminal device 20 may be mobile or fixed, and the terminal device 20 may be a cellular phone, a cordless phone, a Session Initiation Protocol (SIP) phone, a wireless local loop (WLL) station, a personal digital assistant (PDA), a handheld device having a wireless communication function, a computing device, another processing device connected to a wireless modem, an in-vehicle device, a wearable device, a terminal device in a future 5G network, or the like. With emergence of an Internet of Things (IoT) technology, more devices that do not have a communication function previously, for example, but not limited to, a household appliance, a vehicle, a tool device, a service device, and a service facility, start to be configured with a wireless communications unit to obtain the wireless communication function, so that the devices can access a wireless communications network and accept remote control. This type of device has the wireless communication function due to being configured with the wireless communications unit, and therefore, may also be used as the terminal device 20.

When the terminal device 20 moves at a high speed, an environment in which the terminal device 20 is located frequently changes. In a high-density TRP scenario, the terminal device 20 may switch from one TRP to another TRP, or may switch from one TRP set to another TRP set. A reference signal resource that is used for channel measurement and corresponds to the terminal device 20 also needs to change accordingly.

In the prior art, the reference signal resource corresponding to the terminal device keeps unchanged for a long time once being configured, and cannot adapt to a requirement of the terminal device for seamless mobility. Therefore, a reference signal resource configuration manner is not flexible enough.

In order to improve flexibility of configuring the reference signal resource, this application provides a resource indication method. Main invention principles in this application include: A plurality of reference signal resource groups are preset, and these resource groups may correspond to different scenarios or environments. Each resource group includes at least one reference signal resource, and each resource group may be shared by at least one terminal device. In addition, the terminal device may perform resource switching between resource groups, or may perform resource switching within the resource group.

In this application, a reference signal may be, for example, but not limited to, a CRS, a CSI-RS, a DMRS, an SRS, or another reference signal whose function is similar to that of the foregoing reference signal, or may be another reference signal that corresponds to a new function and is introduced to a future standard.

In this application, the reference signal resource may include at least one resource, for example, but not limited to, a time-frequency resource, a port resource, a sequence resource, and a multiplexing code resource that are to be described below. A resource may be represented by a resource set. For example, the time-frequency resource may be represented as a set $\{P_1, P_2, P_3, P_4\}$ (P represents a resource mapping pattern). The example is merely used to explain this application, and should not constitute a limitation.

In this application, the reference signal resource groups may be grouped according to different principles. For example, different reference signal resource groups may be allocated to different TRPs, or different reference signal resource groups may be allocated to TRPs in different areas (in other words, a plurality of TRPs located in a same area correspond to a same reference signal resource group). In an actual application, the reference signal resource group may alternatively be allocated based on a frequency of a TRP. For example, a reference signal resource group corresponding to a high-frequency TRP is different from a reference signal resource group corresponding to a low-frequency TRP. This is not limited herein. In addition, the foregoing principles may further be combined with each other. In this application, each reference signal resource group in the plurality of reference signal resource groups may correspond to at least one TRP set, or correspond to at least one TRP. In other words, each resource group is shared by a terminal device served by at least one TRP set (or at least one TRP). Therefore, each TRP or TRP set is associated with one reference signal resource group. When the TRP or TRP set provides a service for the terminal device, a used reference signal is determined based on the associated reference signal resource group.

The resource indication method provided in this application is described below in detail with reference to the accompanying drawings.

Figure 2:
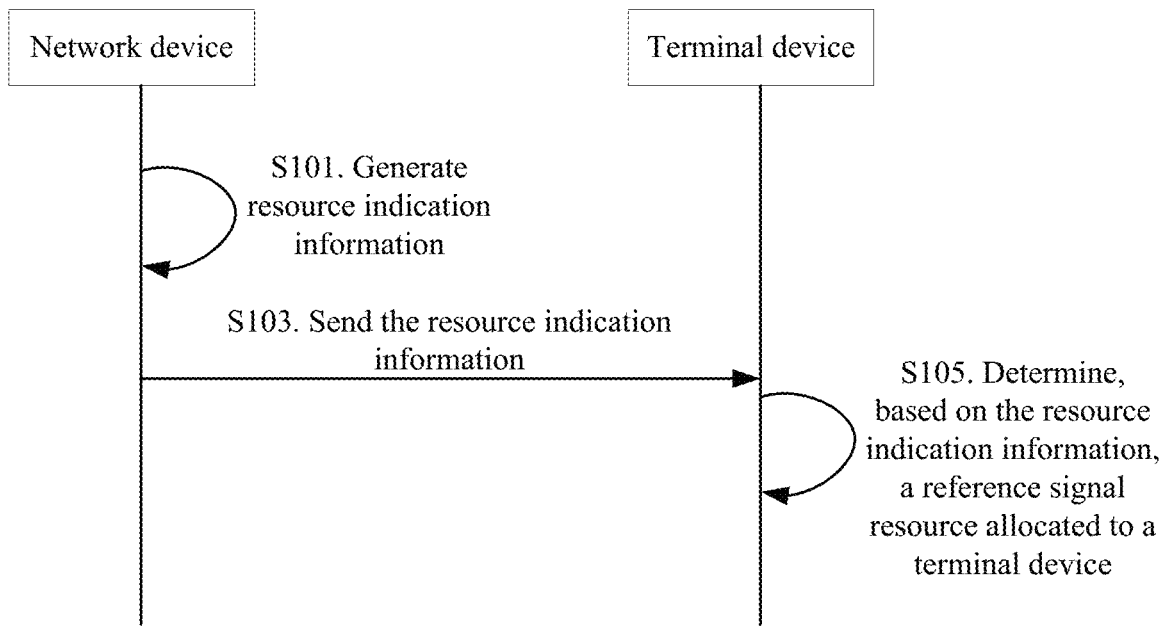
FIG. 2 is a schematic flowchart of a resource indication method according to this application.

FIG. 2 is a schematic flowchart of a resource indication method according to this application. The method shown in FIG. 2 is performed by a network device. The network device may be a transceiver point 10 in FIG. 1, and the transceiver point 10 may be configured to allocate a reference signal resource to a terminal device that is connected to and served by the transceiver point 10. In addition, the transceiver point 10 is within a set 30 of transceiver points (which may also be referred to as a transceiver point set 30), and the transceiver point 10 may be configured to allocate a reference signal resource to a terminal device served by the set 30 of transceiver points. The network device may alternatively be a management node (not shown) corresponding to a set 30 of transceiver points in FIG. 1, and the management node may be configured to allocate a reference signal resource to a terminal device served by the set 30 of transceiver points. The network device may alternatively be a control node (not shown) corresponding to a hypercell in FIG. 1, and the control node may be configured to allocate reference signal resources to all terminal devices in the hypercell. In an actual application, the network device may alternatively be another network entity, for example, a management node corresponding to a plurality of sets of transceiver points. This is not limited herein. As shown in FIG. 2, the method includes the following steps.

S101. The network device generates resource indication information, where the resource indication information is used to indicate a reference signal resource allocated to a terminal device in a reference signal resource group in which the terminal device is located among a plurality of reference signal resource groups.

S103. The network device sends the resource indication information to the terminal device, and correspondingly, the terminal device receives the resource indication information.

S105. After receiving the resource indication information, the terminal device may determine, based on the resource indication information, the reference signal resource allocated to the terminal device.

When the network device is a transceiver point, the reference signal resource group in which the terminal device is located may be a reference signal resource group corresponding to a transceiver point or a transceiver point set that serves the terminal device. In other words, the reference signal resource group in which the terminal device is located may be a reference signal resource group corresponding to the network device that serves the terminal device.

In a specific implementation, the network device may allocate the reference signal resource to the terminal device from the reference signal resource group in which the terminal device is located. The network device may generate the resource indication information for the reference signal resource allocated to the terminal device, and send the resource indication information to the terminal device, to notify the terminal device of the reference signal resource allocated to the terminal device, so that the terminal device may send or receive a reference signal on the resource.

Intra-group switching or inter-group switching may be performed on the reference signal resource of the terminal device.

First: inter-group resource switching.

In an implementation, when the terminal device moves from one location to another location, the terminal device is served by two different network devices (for example, transceiver points) at the former and latter locations. In addition, the two different network devices respectively correspond to different reference signal resource groups. Specifically, a reference signal resource of the terminal device before moving is from a reference signal resource group corresponding to a network device that serves the terminal device at the former location, and a reference signal resource of the terminal device after moving is from a reference signal resource group corresponding to a network device that serves the terminal device at the latter location. In other words, the reference signal resources of the terminal device before and after moving are respectively allocated by different network devices.

In another implementation, when the terminal device moves from one location to another location, the terminal device may be served by a same network device at the former and latter locations. In a specific implementation, the network device may be a management node corresponding to a set of transceiver points, a control node corresponding to a hypercell, a management node corresponding to a plurality of sets of transceiver points, or the like. The network device may perform resource group switching on the terminal device that moves at a high speed. When the terminal device moves to a location corresponding to a new resource group, the network device needs to notify the terminal device of identification information of the new resource group, for example, an ID of the new resource group.

Second: intra-group resource switching. The network device changes the reference signal resource allocated to the terminal device in the resource group corresponding to the terminal device. In this case, the network device needs to notify the terminal device of related information of a new resource, for example, a related index of the new resource. In a specific implementation, the network device may be a transceiver point, a management node corresponding to a set of transceiver points, a control node corresponding to a hypercell, a management node corresponding to a plurality of sets of transceiver points, or the like.

It may be understood that because the terminal device may perform resource switching between resource groups or within the resource group, the plurality of resource groups can implement better resource sharing. For example, for a user-specific beamforming reference signal, although different terminal devices use, at a same moment, resources that totally do not overlap, such resource allocation is dynamic. A resource configured for a terminal device at a previous moment may be reconfigured for another terminal device at a next moment, thereby improving resource configuration flexibility. Flexible and proper resource sharing may further reduce overheads of reference signal resources.

It should be noted that when the reference signal resource group is configured by using a transceiver point set, and a transceiver point generates and sends the resource indication information, the transceiver point may be any transceiver point in a transceiver point set to which the transceiver point belongs. In addition, a primary transceiver point and a secondary transceiver point may be set in the transceiver point set, and the primary transceiver point generates and sends the resource indication information. In an actual application, a transceiver point generating and sending the resource indication information within the transceiver point set may alternatively be set in another manner. This is not limited in this application. In an actual application, another device may alternatively send the resource indication information. This is not limited in this application.

When the network device performs resource switching on the terminal device, the network device needs to regenerate the resource indication information, to notify the terminal device of a new reference signal resource, so that the terminal device receives or sends a reference signal on the new reference signal resource.

In an implementation, the resource indication information may include two parts of content: indication information of the reference signal resource group in which the terminal device is located and indication information of the reference signal resource allocated to the terminal device. To be specific, the network device may indicate, in a same piece of signaling, both the reference signal resource group in which the terminal device is located and the reference signal resource allocated to the terminal device in the reference signal resource group in which the terminal device is located. Correspondingly, the terminal device may determine, based on the indication information of the reference signal resource group, the reference signal resource group in which the terminal device is located, and then may determine, based on the indication information of the reference signal resource, the reference signal resource allocated to the terminal device in the reference signal resource group.

Specifically, the resource indication information may be physical layer indication information, and a typical example of the physical layer indication information may be DCI (Downlink Control Information, downlink control information) in an LTE standard. The resource indication information may alternatively be MAC (Media Access Control, Media Access Control) layer indication information, for example, a MAC CE (Control Entity, control entity). The resource indication information may alternatively be RRC layer indication information, for example, RRC signaling.

For example, the network device may add, to the RRC signaling, or the MAC CE, or the DCI, the indication information of the reference signal resource group and the indication information of the reference signal resource allocated to the terminal device, to simultaneously indicate, to the terminal device, the reference signal resource group in which the terminal device is located and the reference signal resource allocated to the terminal device in the reference signal resource group. The example is merely used to explain this application, and should not constitute a limitation.

In another implementation, the resource indication information may include indication information of the reference signal resource allocated to the terminal device. In addition, the network device may further generate indication information of the reference signal resource group, and send the indication information of the reference signal resource group to the terminal device. The indication information of the reference signal resource group is used to indicate the reference signal resource group in which the terminal device is located. To be specific, the network device may separately indicate, in two pieces of signaling, the reference signal resource group in which the terminal device is located and the reference signal resource allocated to the terminal device in the reference signal resource group in which the terminal device is located.

Correspondingly, the terminal device may further receive the indication information that is of the reference signal resource group and sent by the network device, and determine, based on the indication information of the reference signal resource group, the reference signal resource group in which the terminal device is located. Then, the terminal device may finally determine, with reference to the resource indication information, the specific reference signal resource allocated to the terminal device in the reference signal resource group.

Specifically, the resource indication information may be physical layer indication information, or may be MAC layer indication information, or may be RRC layer indication information, for example, RRC signaling. The indication information of the reference signal resource group may be physical layer indication information, or may be MAC layer indication information, or may be RRC layer indication information. In a specific implementation, a sending sequence of the foregoing two pieces of signaling may be set according to an actual requirement.

For example, the network device may add, to DCI or a MAC CE, the indication information of the reference signal resource allocated to the terminal device. The indication information of the reference signal resource group in which the terminal device is located may be indicated additionally by using RRC signaling. In this way, in the scenario of intra-group resource switching, the network device does not need to frequently indicate, to the terminal device, the reference signal resource group in which the terminal device is located, so that signaling overheads can be reduced. The example is merely used to explain this application, and should not constitute a limitation.

In this application, the reference signal resource may include at least one of the following resources: a time-frequency resource, a port resource, a signal sequence resource, and a multiplexing code resource.

Figure 3:
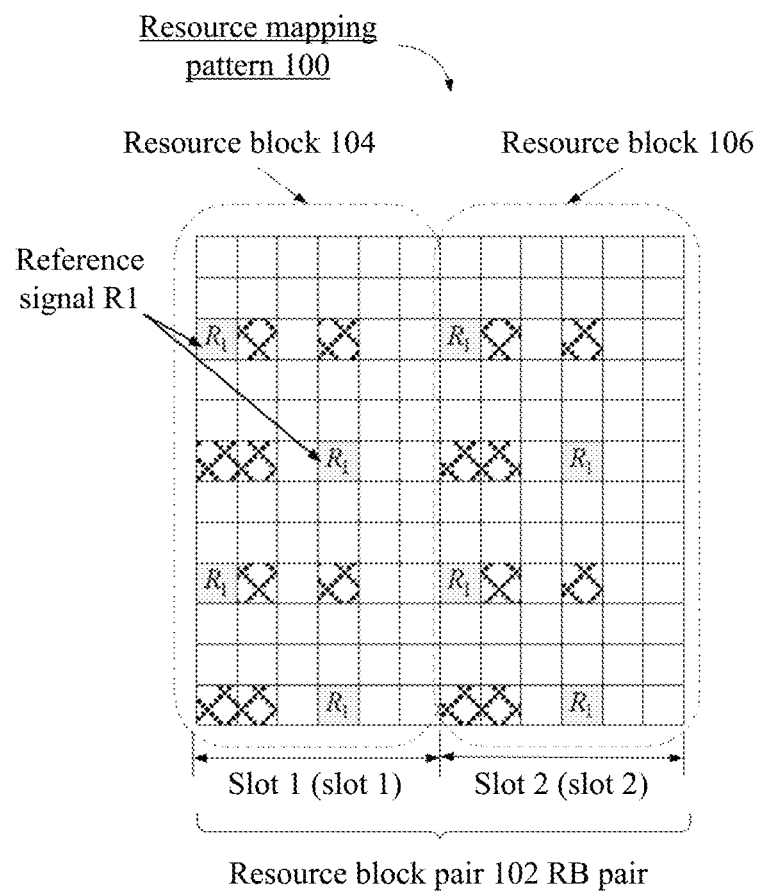
FIG. 3 is a schematic diagram of a resource mapping pattern in this application.

(1) A time-frequency resource corresponding to a reference signal is a time-frequency resource carrying the reference signal. The time-frequency resource may be specifically represented in a plurality of representation forms such as a resource mapping pattern, a formula, and a mapping rule. For example, FIG. 3 is a schematic diagram of a resource mapping pattern of a reference signal. As shown in FIG. 3, in a resource mapping pattern 100, resource elements (RE) occupied by a reference signal R1 corresponding to an antenna port 1 are distributed in a resource block 104 and a resource block 106 that are included in a resource block pair (RB pair) (RB: Resource Block, resource block) 102. The resource block pair 102 may be considered as a resource unit, and a specific form of the resource unit may be defined by a corresponding communications standard. In a specific implementation, an index may be set to indicate various detail features in a specific representation form of the time-frequency resource.

(2) A port resource corresponding to a reference signal is an antenna port transmitting the reference signal. For example, it may be stipulated that a CRS is sent by using antenna ports 1 to 4, a DMRS is sent by using antenna ports 5 and 7 to 14, and a CSI-RS is sent by using antenna ports 15 to 22. In a specific implementation, when the port resource corresponding to the reference signal is indicated, an antenna port value may be indicated, or an index corresponding to an antenna port value may be indicated, or the antenna port is indicated in another manner.

(3) A signal sequence corresponding to a reference signal is a sequence including signal values of the reference signal. For example, the signal value may be a complex number value. The signal sequence may be specifically represented in a plurality of representation forms such as the signal sequence itself or a formula. For example, a reference signal defined in an LTE standard may be represented as the following formula:

$$r_{l,n_s}(m) = 1/\sqrt{2}[1-2c(2m)] + j1/\sqrt{2}[1-2c(2m+1)]$$

Various parameters in the formula and related descriptions have been clearly described in the LTE standard, and details are not described herein. In a specific implementation, a corresponding index may be set to indicate various detail features in a specific representation form of the signal sequence.

(4) Generally, a plurality of reference signals may multiplex a same time-frequency resource. In this case, a multiplexing code needs to be used to distinguish different reference signals multiplexed on the same time-frequency resource. For example, in an existing LTE standard, an orthogonal cover code (Orthogonal Cover Code, OCC) is used to distinguish different DMRSs multiplexed on a same time-frequency resource. The foregoing multiplexing code may be specifically represented in a plurality of representation forms such as the multiplexing code itself or a formula. In a specific implementation, a corresponding index may be set to indicate various detail features in a specific representation form of the multiplexing code.

A principle description is given to the reference signal resource by using examples above. A person skilled in the art should understand that the foregoing content is merely used as an example, but is not used to limit the scope of this application. In fact, specific details of the foregoing content may vary in different technical solutions and communications standards. In an actual application, a specific resource included by the reference signal resource and technical details such as a specific representation form and an indication manner of the resource may be defined according to a specific requirement. Therefore, the scope of this application is not limited by specific examples in the foregoing description, but should be understood to cover various specific technical details of the reference signal resource.

It may be learned from the foregoing content that the resource indication information in this application may be a resource value or a resource index, or a combination of a resource value and a resource index. To be specific, some reference signal resources may be indicated by using resource values, and some other reference signal resources may be indicated by using resource indexes. The resource value may include specific content of a resource mapping pattern (Pattern) of a time-frequency resource, an antenna port, a signal sequence, and a multiplexing code. The resource mapping pattern of the time-frequency resource may include but is not limited to an array, a resource mapping rule, a formula, or the like. The signal sequence may be the signal sequence itself. The antenna port may be a port value. The multiplexing code may be the multiplexing code itself. It should be noted that each of the foregoing resources may have a plurality of different representation forms. Therefore, during resource indication, various resource values in different forms may be used. This application is not limited to one or more types of specific resource values, but should be understood to cover resource values in various forms.

In addition, as described above, in some embodiments, the resource mapping pattern of the time-frequency resource, the antenna port, the signal sequence, and the multiplexing code may alternatively be indicated by using the resource index. The resource index corresponds to the resource value, and is used to indicate the resource value.

In a specific implementation, when the reference signal resource allocated to the terminal device includes a plurality of resources, some resources may be indicated by using resource values, and the other resources may be indicated by using resource indexes. In addition, all resources may be indicated by using resource values, or may be indicated by using resource indexes.

As described above, the reference signal resource may include at least one resource, for example, but not limited to, a time-frequency resource, a port resource, a sequence resource, and a multiplexing code resource. A resource may be represented by a resource set. For example, the time-frequency resource may be represented as a set $\{P_1, P_2, P_3, P_4\}$ (P represents a resource mapping pattern), and the port resource may be represented as a set $\{1, 2, 3, 4\}$ (1, 2, 3, and 4 respectively represent four antenna ports).

In an implementation, a resource may be allocated to the terminal device from a resource set corresponding to each resource. For example, a port 2 indicated by "2" is allocated to the terminal device from an antenna port set {1, 2, 3, 4}, and a time-frequency resource indicated by a resource mapping pattern $P_2$ is allocated to the terminal device from a resource mapping pattern set {$P_1$, $P_2$, $P_3$, $P_4$}. The example is merely used to explain this application, and should not constitute a limitation. In this case, the resource indication information may be used to indicate the resource allocated to the terminal device from the resource set corresponding to each resource.

In another implementation, the reference signal resource allocated to the terminal device may alternatively be a preset combination of the foregoing various resources, for example, a preset combination formed by the time-frequency resource, the port resource, the sequence resource, and the multiplexing code resource. In this case, the resource indication information may be used to indicate a preset combination allocated to the terminal device.

In this application, the network device may further generate resource configuration information, and send the resource configuration information to the terminal device. The resource configuration information may be used to identify each reference signal resource of each reference signal resource group in the plurality of reference signal resource groups. Correspondingly, the terminal device may receive the resource configuration information, and determine, based on the resource configuration information, each reference signal resource of each reference signal resource group in the plurality of reference signal resource groups.

In an implementation of this application, the resource configuration information may include identification information of each resource group in the plurality of reference signal resource groups, and resource sets corresponding to various resources in each resource group, for example, an antenna port set, a signal sequence set, a resource mapping pattern set, and a multiplexing code set. Information included in each of the foregoing resource sets may be a specific resource value, or may be a resource index corresponding to a resource value, or may be a resource value and a resource index corresponding to the resource value. It should be understood that when information included in a resource set is a resource index, a resource value corresponding to the resource index may be prestored in a related device. There is a large quantity of specific implementations, for example, writing the resource value to the related device in advance before delivery of the device. Details are not described in this specification.

For example, a reference signal resource group in the resource configuration information may include the following:

G1
{1, 2, 3, 4}
{$S_3$, $S_4$, $S_5$, $S_6$, $S_9$, $S_{10}$}
{$P_1$, $P_2$, $P_3$, $P_4$}
{$M_2$, $M_4$, $M_5$, $M_6$, $M_7$, $M_9$}

G1 is an identifier of the reference signal resource group, {1, 2, 3, 4} is an antenna port set, {$S_3$, $S_4$, $S_5$, $S_6$, $S_9$, $S_{10}$} is a signal sequence set, {$P_1$, $P_2$, $P_3$, $P_4$} is a resource mapping pattern set, and {$M_2$, $M_4$, $M_5$, $M_6$, $M_7$, $M_9$} is a multiplexing code set.

With reference to the foregoing example, for another example, the indication information of the reference signal resource allocated to the terminal device may include: (2, $S_3$, $P_2$, $M_7$), where 2 indicates an antenna port, $S_3$ indicates a signal sequence $S_3$, $P_2$ indicates a resource mapping pattern, and $M_7$ indicates a multiplexing code. In a specific implementation, the indication information may include the identifier G1 of the reference signal resource group, or may not include the identifier G1.

In another implementation of this application, the resource configuration information may include identification information of each resource group in the plurality of reference signal resource groups and a plurality of preset combinations formed by the foregoing various resources. The resource configuration information may further include a resource index corresponding to each preset combination. For example, the resource configuration information may be shown in Table 1.

TABLE 1

| Resource group identifier | Resource index | Port | Signal sequence | Resource mapping pattern | Multiplexing code |
|---|---|---|---|---|---|
| G1 | Res_1 | 1 | $S_5$ | $P_1$ | $M_2$ |
|    | Res_2 | 2 | $S_4$ | $P_2$ | $M_4$ |
|    | Res_3 | 2 | $S_{10}$ | $P_3$ | $M_2$ |
| G2 | Res_1 | 3 | $S_9$ | $P_4$ | $M_2$ |
|    | Res_2 | 2 | $S_3$ | $P_2$ | $M_7$ |
| ... | ... | ... | ... | ... | ... |

A first preset combination in Table 1 (namely, {Res_1, 1, $S_5$, $P_1$, $M_2$}) is used as an example for description. The preset combination includes a port 1, a sequence $S_5$, a resource mapping pattern $P_1$, and a multiplexing code $M_2$. A resource index corresponding to the preset combination is Res_1. It should be noted that Table 1 is merely an implementation of this application, and should not constitute a limitation. In an actual application, for some reference signals such as a DMRS, a resource mapping pattern is in one-to-one correspondence with a port number. In other words, for the DMRS, a port number may be used to indicate a specific resource mapping pattern. Therefore, resource configuration information of the DMRS may only need to include either of the port number and an identifier of the resource mapping pattern, with no need to include both.

In a specific implementation, indication information of various resources included in the resource configuration information shown in Table 1 may be a resource index. For example, a corresponding resource index may be configured for each resource mapping pattern. In this way, when a reference signal resource is allocated to the terminal, it may be implemented that only a resource index representing a resource mapping pattern needs to be notified to the terminal device to implement resource configuration, thereby saving air interface resources.

In a specific implementation, a resource index (for example, Res_1) corresponding to a preset combination may be a local index within a resource group (for example, G1), as shown in Table 1. In this way, when the network device sends the resource index to the terminal device, the terminal device further needs to determine, based on a resource group in which the terminal device is currently located, a resource indicated by the resource index. In some embodiments, the resource index corresponding to the preset combination may alternatively be a global index, namely, a unique index in the plurality of reference signal resource groups. In this way, when the network device sends the resource index to the terminal device, the terminal device may determine a corresponding resource based on the unique resource index.

In a specific implementation, the network device may send the resource configuration information to the terminal device in, but not limited to, the following manners.

In an implementation, when the terminal device is connected to the network device, the network device may deliver the resource configuration information to the terminal device. An application scenario corresponding to this implementation may include: Once the terminal device moves and is connected to a new transceiver point, the new transceiver point delivers the resource configuration information to the terminal device.

In another implementation, the network device may periodically send the resource configuration information to the terminal device by using static signaling such as RRC signaling, to indicate resources included by the plurality of reference signal resource groups within a relatively long signaling period.

In still another implementation, the network device may broadcast the resource configuration information by using a fixed period. A terminal device on which resource configuration has not been performed completes the resource configuration when sensing the broadcast.

In yet another implementation, when the terminal device accesses a communications network, an access network device of the communications network sends the resource configuration information to the terminal device.

It should be noted that the network device may alternatively deliver the resource configuration information to the terminal device in another manner, for example, by using MAC layer indication information (such as a MAC CE) or physical layer indication information (such as DCI). This is not limited in this application. In addition, a sending occasion, a sending manner, and a sending device of the resource configuration information may further be set according to a specific requirement. The scope of this application is not limited by the foregoing specific examples.

The following specifically describes this application by separately using a CSI-RS, a DMRS, and an SRS as an example.

Embodiment 1: A plurality of CSI-RS resource groups are preset, where each resource group includes at least one CSI-RS resource, and each CSI-RS resource group may be shared by at least one terminal device. In addition, the terminal device may perform resource switching between CSI-RS resource groups, or may perform resource switching within the CSI-RS resource group. For a specific implementation of how to group the CSI-RS resource groups, refer to the foregoing content. Details are not described herein again.

It may be learned from the foregoing content that the CSI-RS resource may include at least one resource, for example, but not limited to, a time-frequency resource, a port resource, a sequence resource, and a multiplexing code resource. A resource may be represented by a resource set. For example, the time-frequency resource may be represented as a set $\{P_1, P_2, P_3, P_4\}$ (P represents a resource mapping pattern), and the port resource may be represented as a set $\{1, 2, 3, 4\}$ (1, 2, 3, and 4 respectively represent four antenna ports).

In an implementation, a CSI-RS resource may be allocated to the terminal device from a resource set corresponding to each resource. For example, a port 2 indicated by "2" is allocated to the terminal device from an antenna port set $\{1, 2, 3, 4\}$, and a time-frequency resource indicated by a resource mapping pattern $P_2$ is allocated to the terminal device from a resource mapping pattern set $\{P_1, P_2, P_3, P_4\}$. The example is merely used to explain this application, and should not constitute a limitation. In this case, the resource indication information may be used to indicate the CSI-RS resource allocated to the terminal device from the resource set corresponding to each resource.

In another implementation, the CSI-RS resource allocated to the terminal device may alternatively be a preset combination of the foregoing various resources, for example, a preset combination formed by the time-frequency resource, the port resource, the sequence resource, and the multiplexing code resource. In this case, the resource indication information may be used to indicate a preset combination allocated to the terminal device. For example, a preset combination (2, $S_3$, $P_2$, $M_7$) may be represented as the CSI-RS resource allocated to the terminal device, where 2 indicates an antenna port, $S_3$ indicates a signal sequence, $P_2$ indicates a resource mapping pattern, and $M_7$ indicates a multiplexing code. The example is merely used to explain this application, and should not constitute a limitation.

In Embodiment 1, when allocating a CSI-RS resource to the terminal device or performing CSI-RS resource switching on the terminal device, the network device may generate resource indication information and send the resource indication information to the terminal device. The resource indication information is used to indicate the CSI-RS resource allocated to the terminal device in a CSI-RS resource group in which the terminal device is located in the plurality of CSI-RS reference signal resource groups.

In an implementation, the resource indication information may include two parts of content: indication information of the CSI-RS resource group in which the terminal device is located and indication information of the specific CSI-RS resource allocated to the terminal device. To be specific, the network device may indicate, in a same piece of signaling, both the CSI-RS resource group in which the terminal device is located and the CSI-RS resource allocated to the terminal device in the CSI-RS resource group in which the terminal device is located.

For example, the network device may add the indication information represented by the foregoing two parts of content to RRC signaling, or a MAC CE, or DCI, to simultaneously indicate, to the terminal device, the CSI-RS resource group in which the terminal device is located and the CSI-RS resource allocated to the terminal device in the CSI-RS resource group. The example is merely used to explain this application, and should not constitute a limitation.

In another implementation, the resource indication information may include indication information of the specific CSI-RS resource allocated to the terminal device. In addition, the network device may further generate indication information of the CSI-RS resource group, and send the indication information of the CSI-RS resource group to the terminal device. The indication information of the CSI-RS resource group is used to indicate the CSI-RS resource group in which the terminal device is located. To be specific, the network device may separately indicate, in two pieces of signaling, the CSI-RS resource group in which the terminal device is located and the CSI-RS resource allocated to the terminal device in the CSI-RS resource group in which the terminal device is located.

For example, the network device may add, to DCI or a MAC CE, the indication information of the specific CSI-RS resource allocated to the terminal device. The indication information of the CSI-RS resource group in which the terminal device is located may be indicated additionally by using RRC signaling. In this way, in the scenario of resource switching within the CSI-RS group, the network device does not need to frequently indicate, to the terminal device, the CSI-RS resource group in which the terminal device is located, so that signaling overheads can be reduced. The example is merely used to explain this application, and should not constitute a limitation.

In Embodiment 1, the resource indication information of the CSI-RS resource allocated to the terminal device may be a resource value or a resource index, or a combination of a resource value and a resource index.

In a specific implementation, when the CSI-RS resource allocated to the terminal device includes a plurality of resources, some resources may be indicated by using resource values, and the other resources may be indicated by using resource indexes. In addition, all resources may be indicated by using resource values, or may be indicated by using resource indexes.

In addition, it may be learned from the foregoing content that the network device may further generate CSI-RS resource configuration information, and send the CSI-RS resource configuration information to the terminal device, to reduce signaling overheads and save air interface resources. The CSI-RS resource configuration information may be used to indicate each CSI-RS resource of each CSI-RS resource group in the plurality of CSI-RS resource groups.

In an implementation, the CSI-RS resource configuration information may include identification information of each CSI-RS resource group in the plurality of CSI-RS resource groups, and resource sets corresponding to various resources in each CSI-RS resource group, for example, an antenna port set, a signal sequence set, a resource mapping pattern set, and a multiplexing code set. Information included in each of the foregoing resource sets may be a specific resource value, or may be a resource index corresponding to a resource value, or may be a resource value and a resource index corresponding to the resource value. For an example description in this implementation, refer to the foregoing content. Details are not described herein again.

In another implementation, the CSI-RS resource configuration information may include identification information of each CSI-RS resource group in the plurality of CSI-RS resource groups and a plurality of preset combinations formed by various resources (including but not limited to a time-frequency resource, a port resource, a sequence resource, a multiplexing code resource, and the like). The CSI-RS resource configuration information may further include a resource index corresponding to each preset combination. For an example description in this implementation, refer to the foregoing content. Details are not described herein again.

In Embodiment 1, each of the foregoing various indication information (including the indication information of the CSI-RS resource, the indication information of the CSI-RS resource group, and the CSI-RS resource configuration information) may be implemented by using RRC layer signaling, or MAC layer signaling, or physical layer signaling. Preferably, the network device may send the CSI-RS resource configuration information by using RRC layer signaling, and may send, by using MAC layer signaling (such as a MAC CE) or physical layer signaling (such as DCI), the resource indication information or the indication information of the CSI-RS resource group in which the terminal device is located.

It may be understood that because the terminal device may perform resource switching between resource groups or within the resource group, the plurality of CSI-RS resource groups can implement better resource sharing. For example, for a user-specific beamforming CSI-RS, although different terminal devices use, at a same moment, resources that totally do not overlap, such resource allocation is dynamic. A CSI-RS resource configured for a terminal device at a previous moment may be reconfigured for another terminal device at a next moment, thereby improving flexibility of CSI-RS resource configuration. Flexible and proper resource sharing may further reduce overheads of the CSI-RS resource.

In addition, when the CSI-RS resource is allocated to the terminal device, the following policy may be used: CSI-RS resources allocated to terminal devices in a same CSI-RS resource group need to be orthogonal, and CSI-RS resources allocated to terminal devices between adjacent CSI-RS resource groups need to have low correlation. CSI-RS resource groups that are far apart from each other may reuse a signal sequence and a time-frequency resource (such as a resource mapping pattern). In this way, channel estimation performance can be improved.

Embodiment 2: A plurality of DMRS resource groups are preset, where each resource group includes at least one DMRS resource, and each DMRS resource group may be shared by at least one terminal device. In addition, the terminal device may perform resource switching between DMRS resource groups, or may perform resource switching within the DMRS resource group. For a specific implementation of how to group the DMRS resource groups, refer to the foregoing content. Details are not described herein again.

It may be learned from the foregoing content that the DMRS resource may include at least one resource, for example, but not limited to, a time-frequency resource, a port resource, a sequence resource, and a multiplexing code resource. A resource may be represented by a resource set. For example, the time-frequency resource may be represented as a set $\{P_1, P_2, P_3, P_4\}$ (P represents a resource mapping pattern), and the port resource may be represented as a set $\{1, 2, 3, 4\}$ (1, 2, 3, and 4 respectively represent four antenna ports).

In an implementation, a DMRS resource may be allocated to the terminal device from a resource set corresponding to each resource. For example, a port 2 indicated by "2" is allocated to the terminal device from an antenna port set $\{1, 2, 3, 4\}$, and a time-frequency resource indicated by a resource mapping pattern $P_2$ is allocated to the terminal device from a resource mapping pattern set $\{P_1, P_2, P_3, P_4\}$. The example is merely used to explain this application, and should not constitute a limitation. In this case, the resource indication information may be used to indicate the DMRS resource allocated to the terminal device from the resource set corresponding to each resource.

In another implementation, the DMRS resource allocated to the terminal device may alternatively be a preset combination of the foregoing various resources, for example, a preset combination formed by the time-frequency resource, the port resource, the sequence resource, and the multiplexing code resource. In this case, the resource indication information may be used to indicate a preset combination allocated to the terminal device. For example, a preset combination $(2, S_3, P_2, M_7)$ may be represented as the DMRS resource allocated to the terminal device, where 2 indicates an antenna port, $S_3$ indicates a signal sequence, $P_2$ indicates a resource mapping pattern, and $M_7$ indicates a multiplexing code. The example is merely used to explain this application, and should not constitute a limitation.

In Embodiment 2, when allocating a DMRS resource to the terminal device or performing DMRS resource switching on the terminal device, the network device may generate resource indication information and send the resource indication information to the terminal device. The resource indication information is used to indicate the DMRS resource allocated to the terminal device in a DMRS resource group in which the terminal device is located in the plurality of DMRS reference signal resource groups.

In an implementation, the resource indication information may include two parts of content: indication information of the DMRS resource group in which the terminal device is located and indication information of the specific DMRS resource allocated to the terminal device. To be specific, the network device may indicate, in a same piece of signaling, both the DMRS resource group in which the terminal device is located and the DMRS resource allocated to the terminal device in the DMRS resource group in which the terminal device is located.

For example, the network device may add the indication information represented by the foregoing two parts of content to RRC signaling, or a MAC CE, or DCI, to simultaneously indicate, to the terminal device, the DMRS resource group in which the terminal device is located and the DMRS resource allocated to the terminal device in the DMRS resource group. The example is merely used to explain this application, and should not constitute a limitation.

In another implementation, the resource indication information may include indication information of the specific DMRS resource allocated to the terminal device. In addition, the network device may further generate indication information of the DMRS resource group, and send the indication information of the DMRS resource group to the terminal device. The indication information of the DMRS resource group is used to indicate the DMRS resource group in which the terminal device is located. To be specific, the network device may separately indicate, in two pieces of signaling, the DMRS resource group in which the terminal device is located and the DMRS resource allocated to the terminal device in the DMRS resource group in which the terminal device is located.

For example, the network device may add, to DCI or a MAC CE, the indication information of the specific DMRS resource allocated to the terminal device. The indication information of the DMRS resource group in which the terminal device is located may be indicated additionally by using RRC signaling. In this way, in the scenario of resource switching within the DMRS group, the network device does not need to frequently indicate, to the terminal device, the DMRS resource group in which the terminal device is located, so that signaling overheads can be reduced. The example is merely used to explain this application, and should not constitute a limitation.

In Embodiment 2, the resource indication information of the DMRS resource allocated to the terminal device may be a resource value or a resource index, or a combination of a resource value and a resource index. Different from Embodiment 1, because a port of a DMRS is in one-to-one correspondence with a resource mapping pattern, the resource indication information does not need to include both a port value (or an index) of an antenna port and a resource mapping pattern (or an index), so that signaling overheads can be reduced.

In addition, it may be learned from the foregoing content that the network device may further generate DMRS resource configuration information, and send the DMRS resource configuration information to the terminal device, to reduce signaling overheads and save air interface resources. The DMRS resource configuration information may be used to indicate each DMRS resource of each DMRS resource group in the plurality of DMRS resource groups.

In an implementation, the DMRS resource configuration information may include identification information of each DMRS resource group in the plurality of DMRS resource groups, and resource sets corresponding to various resources in each DMRS resource group, for example, an antenna port set, a signal sequence set, a resource mapping pattern set, and a multiplexing code set. Information included in each of the foregoing resource sets may be a specific resource value, or may be a resource index corresponding to a resource value, or may be a resource value and a resource index corresponding to the resource value. For an example description in this implementation, refer to the foregoing content. Details are not described herein again.

In another implementation, the DMRS resource configuration information may include identification information of each DMRS resource group in the plurality of DMRS resource groups and a plurality of preset combinations formed by various resources (including but not limited to a time-frequency resource, a port resource, a sequence resource, a multiplexing code resource, and the like). The DMRS resource configuration information may further include a resource index corresponding to each preset combination. For an example description in this implementation, refer to the foregoing content. Details are not described herein again.

In Embodiment 2, each of the foregoing various indication information (including the indication information of the DMRS resource, the indication information of the DMRS resource group, and the DMRS resource configuration information) may be implemented by using RRC layer signaling, or MAC layer signaling, or physical layer signaling. Preferably, the network device may send the DMRS resource configuration information by using RRC layer signaling, and may send, by using MAC layer signaling (such as a MAC CE) or physical layer signaling (such as DCI), the resource indication information or the indication information of the DMRS resource group in which the terminal device is located.

It may be understood that because the terminal device may perform resource switching between DMRS resource groups or within the DMRS resource group, the plurality of DMRS resource groups can implement better resource sharing.

In addition, when the DMRS resource is allocated to the terminal device, the following policy may be used: DMRS resources allocated to terminal devices in a same DMRS resource group need to be orthogonal, and DMRS resources allocated to terminal devices between adjacent DMRS resource groups need to have low correlation. DMRS resource groups that are far apart from each other may reuse a signal sequence and a resource mapping pattern. In this way, channel estimation performance can be improved.

When performing interference measurement and interference suppression, a network side only needs to obtain DMRS information of a scheduled terminal device in the DMRS resource group in which the terminal device is located, and does not need to obtain DMRS information of all scheduled terminal devices in an entire cell, thereby greatly reducing signaling overheads.

Embodiment 3: A plurality of SRS resource groups are preset, where each resource group includes at least one SRS resource, and each SRS resource group may be shared by at least one terminal device. In addition, the terminal device may perform resource switching between SRS resource groups, or may perform resource switching within the SRS resource group. For a specific implementation of how to group the SRS resource groups, refer to the foregoing content. Details are not described herein again.

It may be learned from the foregoing content that the SRS resource may include at least one resource, for example, but not limited to, a time-frequency resource, a port resource, a sequence resource, and a multiplexing code resource. A resource may be represented by a resource set. For example, the time-frequency resource may be represented as a set $\{P_1, P_2, P_3, P_4\}$ (P represents a resource mapping pattern), and the port resource may be represented as a set $\{1, 2, 3, 4\}$ (1, 2, 3, and 4 respectively represent four antenna ports).

In an implementation, an SRS resource may be allocated to the terminal device from a resource set corresponding to each resource. For example, a port 2 indicated by "2" is allocated to the terminal device from an antenna port set $\{1, 2, 3, 4\}$, and a time-frequency resource indicated by a resource mapping pattern $P_2$ is allocated to the terminal device from a resource mapping pattern set $\{P_1, P_2, P_3, P_4\}$. The example is merely used to explain this application, and should not constitute a limitation. In this case, the resource indication information may be used to indicate the SRS resource allocated to the terminal device from the resource set corresponding to each resource.

In another implementation, the SRS resource allocated to the terminal device may alternatively be a preset combination of the foregoing various resources, for example, a preset combination formed by the time-frequency resource, the port resource, the sequence resource, and the multiplexing code resource. In this case, the resource indication information may be used to indicate a preset combination allocated to the terminal device. For example, a preset combination (2, $S_3$, $P_2$, $M_7$) may be represented as the SRS resource allocated to the terminal device, where 2 indicates an antenna port, $S_3$ indicates a signal sequence, $P_2$ indicates a resource mapping pattern, and $M_7$ indicates a multiplexing code. The example is merely used to explain this application, and should not constitute a limitation.

In Embodiment 3, when allocating an SRS resource to the terminal device or performing SRS resource switching on the terminal device, the network device may generate resource indication information and send the resource indication information to the terminal device. The resource indication information is used to indicate the SRS resource allocated to the terminal device in an SRS resource group in which the terminal device is located in the plurality of SRS reference signal resource groups.

In an implementation, the resource indication information may include two parts of content: indication information of the SRS resource group in which the terminal device is located and indication information of the specific SRS resource allocated to the terminal device. To be specific, the network device may indicate, in a same piece of signaling, both the SRS resource group in which the terminal device is located and the SRS resource allocated to the terminal device in the SRS resource group in which the terminal device is located.

For example, the network device may add the indication information represented by the foregoing two parts of content to RRC signaling, or a MAC CE, or DCI, to simultaneously indicate, to the terminal device, the SRS resource group in which the terminal device is located and the SRS resource allocated to the terminal device in the SRS resource group. The example is merely used to explain this application, and should not constitute a limitation.

In another implementation, the resource indication information may include indication information of the specific SRS resource allocated to the terminal device. In addition, the network device may further generate indication information of the SRS resource group, and send the indication information of the SRS resource group to the terminal device. The indication information of the SRS resource group is used to indicate the SRS resource group in which the terminal device is located.

For example, the network device may add, to DCI or a MAC CE, the indication information of the specific SRS resource allocated to the terminal device. The indication information of the SRS resource group in which the terminal device is located may be indicated additionally by using RRC signaling. In this way, in the scenario of resource switching within the SRS group, the network device does not need to frequently indicate, to the terminal device, the SRS resource group in which the terminal device is located, so that signaling overheads can be reduced. The example is merely used to explain this application, and should not constitute a limitation.

In Embodiment 3, the resource indication information of the SRS resource allocated to the terminal device may be a resource value or a resource index, or a combination of a resource value and a resource index.

In a specific implementation, when the SRS resource allocated to the terminal device includes a plurality of resources, some resources may be indicated by using resource values, and the other resources may be indicated by using resource indexes. In addition, all resources may be indicated by using resource values, or may be indicated by using resource indexes.

In addition, it may be learned from the foregoing content that the network device may further generate SRS resource configuration information, and send the SRS resource configuration information to the terminal device, to reduce signaling overheads and save air interface resources. The SRS resource configuration information may be used to indicate each SRS resource of each SRS resource group in the plurality of SRS resource groups.

In an implementation, the SRS resource configuration information may include identification information of each SRS resource group in the plurality of SRS resource groups, and resource sets corresponding to various resources in each SRS resource group, for example, an antenna port set, a signal sequence set, a resource mapping pattern set, and a multiplexing code set. Information included in each of the foregoing resource sets may be a specific resource value, or may be a resource index corresponding to a resource value, or may be a resource value and a resource index corresponding to the resource value. For an example description in this implementation, refer to the foregoing content. Details are not described herein again.

In another implementation, the SRS resource configuration information may include identification information of each SRS resource group in the plurality of SRS resource groups and a plurality of preset combinations formed by various resources (including but not limited to a time-frequency resource, a port resource, a sequence resource, a multiplexing code resource, and the like). The SRS resource configuration information may further include a resource index corresponding to each preset combination. For an example description in this implementation, refer to the foregoing content. Details are not described herein again.

In Embodiment 3, each of the foregoing various indication information (including the indication information of the SRS resource, the indication information of the SRS resource group, and the SRS resource configuration information) may be implemented by using RRC layer signaling, or MAC layer signaling, or physical layer signaling. Preferably, the network device may send the SRS resource configuration information by using RRC layer signaling, and may send, by using MAC layer signaling (such as a MAC CE) or physical layer signaling (such as DCI), the resource indication information or the indication information of the SRS resource group in which the terminal device is located.

It may be understood that because the terminal device may perform resource switching between SRS resource groups or within the SRS resource group, the plurality of SRS resource groups can implement better resource sharing.

In addition, when the SRS resource is allocated to the terminal device, the following policy may be used: SRS resources allocated to terminal devices in a same SRS resource group need to be orthogonal, and SRS resources allocated to terminal devices between adjacent SRS resource groups need to have low correlation. SRS resource groups that are far apart from each other may reuse a signal sequence and a time-frequency resource (such as a resource mapping pattern). In this way, channel estimation performance can be improved.

Figure 4:
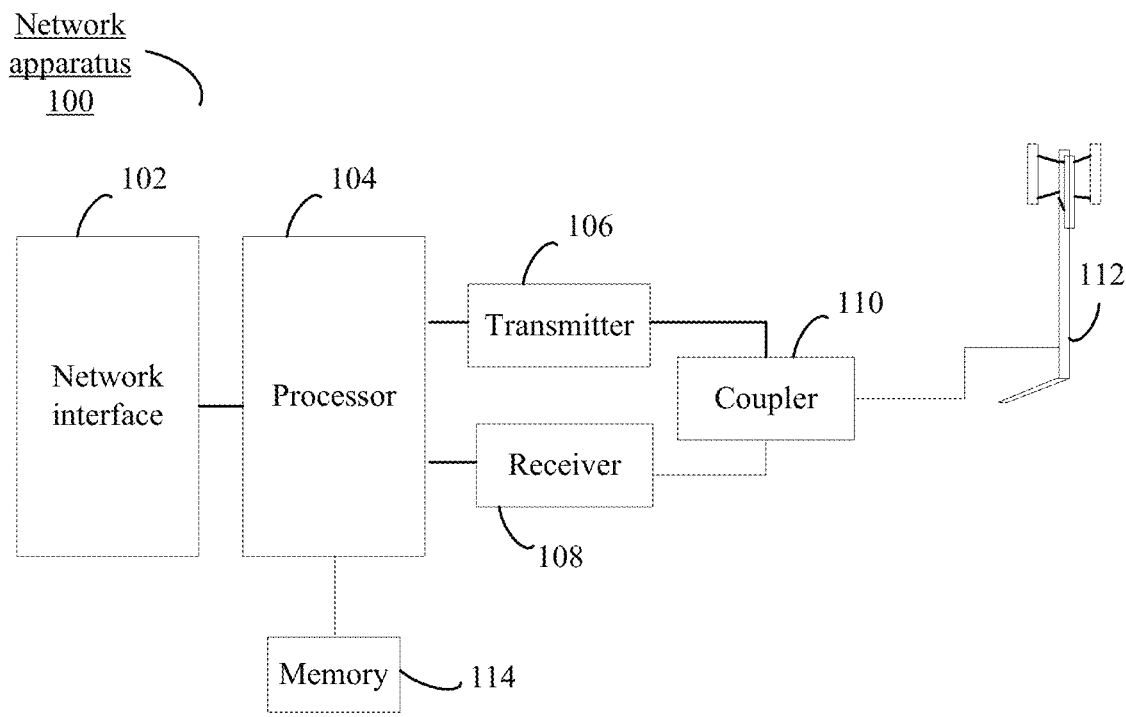
FIG. 4 is a schematic structural diagram of a network apparatus according to this application.

Based on a same inventive conception, this application further provides a network apparatus. The network apparatus is configured to implement the method described in the embodiment of FIG. 2. As shown in FIG. 4, the network apparatus 100 may include: a network interface 102, a processor 104, a transmitter 106, a receiver 108, a coupler 110, an antenna 112, and a memory 114. The transmitter 106 is configured to send a signal to another communications device, and the receiver 108 is configured to receive a signal sent by another communications device. The coupler 110 is connected to the transmitter 106 and the receiver 108, and may be configured to split a sent signal and a received signal. The antenna 112 is connected to a front end of the coupler 110, and may be configured to transmit an electromagnetic signal to external space or receive an electromagnetic signal from an external environment. The memory 114 is coupled to the processor 104, and is configured to store various software programs and/or a plurality of sets of instructions. In a specific implementation, the memory 114 may include a high-speed random access memory, or may include a non-volatile memory, for example, one or more disk storage devices, flash memory devices, or another non-volatile solid-state storage device.

Specifically, the processor 104 in the network apparatus 100 may invoke program code stored in the memory 114 to perform the following operations: generating resource indication information, and sending the resource indication information to a terminal device by using the transmitter 106. The resource indication information is used to indicate a reference signal resource allocated to the terminal device in a reference signal resource group in which the terminal device is located among a plurality of reference signal resource groups.

In this application, the processor 104 may preset the plurality of reference signal resource groups. Each resource group includes at least one reference signal resource, and each resource group may be shared by at least one terminal device.

In this application, the processor 104 may group the reference signal resource groups according to different principles. For example, different reference signal resource groups may be allocated to different TRPs, or different reference signal resource groups may be allocated to TRPs in different areas (in other words, a plurality of TRPs located in a same area correspond to a same reference signal resource group). In an actual application, the reference signal resource group may alternatively be allocated based on a frequency of a TRP. For example, a reference signal resource group corresponding to a high-frequency TRP is different from a reference signal resource group corresponding to a low-frequency TRP. This is not limited herein. In addition, the foregoing principles may further be combined with each other.

In this application, each reference signal resource group in the plurality of reference signal resource groups may correspond to at least one TRP set, or correspond to at least one TRP. In other words, each resource group is shared by a terminal device served by at least one TRP set (or at least one TRP).

In this application, the reference signal resource may include at least one resource, for example, but not limited to, a time-frequency resource, a port resource, a sequence resource, and a multiplexing code resource that are to be described below. A resource may be represented by a resource set. For example, the time-frequency resource may be represented as a set $\{P_1, P_2, P_3, P_4\}$ (P represents a resource mapping pattern). The example is merely used to explain this application, and should not constitute a limitation.

In an implementation, the resource indication information may include two parts of content: indication information of the reference signal resource group in which the terminal device is located and indication information of the reference signal resource allocated to the terminal device. To be specific, the processor 104 may indicate, in a same piece of signaling, both the reference signal resource group in which the terminal device is located and the reference signal resource allocated to the terminal device in the reference signal resource group in which the terminal device is located.

Specifically, the resource indication information may be physical layer indication information, or may be MAC layer indication information, or may be RRC layer indication information, for example, RRC signaling.

In another implementation, the resource indication information may include indication information of the reference signal resource allocated to the terminal device. In addition, the processor 104 may further generate indication information of the reference signal resource group, and send the indication information of the reference signal resource group to the terminal device by using the transmitter 106. The indication information of the reference signal resource group is used to indicate the reference signal resource group in which the terminal device is located. To be specific, the processor 104 may separately indicate, in two pieces of signaling, the reference signal resource group in which the terminal device is located and the reference signal resource allocated to the terminal device in the reference signal resource group in which the terminal device is located.

Specifically, the resource indication information may be physical layer indication information, or may be MAC layer indication information, or may be RRC layer indication information, for example, RRC signaling. The indication information of the reference signal resource group may be physical layer indication information, or may be MAC layer indication information, or may be RRC layer indication information. In a specific implementation, the processor 104 may set a sending sequence of the foregoing two pieces of signaling according to an actual requirement.

The resource indication information in this application may be a resource value or a resource index, or a combination of a resource value and a resource index. In a specific implementation, when the reference signal resource allocated to the terminal device includes a plurality of resources, the processor 104 may indicate some resources by using resource values, and may indicate the other resources by using resource indexes. In addition, the processor 104 may alternatively indicate all resources by using resource values, or may indicate all resources by using resource indexes.

In this application, the processor 104 may further generate resource configuration information, and send the resource configuration information to the terminal device by using the transmitter 106. The resource configuration information may be used to identify each reference signal resource of each reference signal resource group in the plurality of reference signal resource groups.

In a specific implementation, the processor 104 may send the resource configuration information to the terminal device in, but not limited to, the following manners.

In an implementation, when the terminal device is connected to the network apparatus 100, the processor 104 may deliver the resource configuration information to the terminal device by using the transmitter 106.

In another implementation, the processor 104 may periodically use the transmitter 106 to send the resource configuration information to the terminal device by using static signaling such as RRC signaling, to indicate resources included by the plurality of reference signal resource groups within a relatively long signaling period.

In still another implementation, the processor 104 may use the transmitter 106 to broadcast the resource configuration information by using a fixed period. A terminal device on which resource configuration has not been performed completes the resource configuration when sensing the broadcast.

In yet another implementation, the network apparatus 100 may be an access network element of a communications network. When the terminal device accesses the communications network, the processor 104 may use the transmitter 106 to send the resource configuration information to the terminal device.

It should be noted that the processor 104 may alternatively use the transmitter 106 to deliver the resource configuration information to the terminal device in another manner, for example, by using MAC layer indication information (such as a MAC CE) or physical layer indication information (such as DCI). This is not limited in this application. In addition, a sending occasion, a sending manner, and a sending device of the resource configuration information may further be set according to a specific requirement. The scope of this application is not limited by the foregoing specific examples.

It should be noted that for content not mentioned in the embodiment of FIG. 4, refer to the embodiment of FIG. 2 and the foregoing content. Details are not described herein again.

In an actual application, the network apparatus 100 may be a transceiver point 10 in FIG. 1, and the transceiver point 10 may be configured to allocate a reference signal resource to a terminal device connected to the transceiver point 10. The network device may alternatively be a management node (not shown) corresponding to a set 30 of transceiver points in FIG. 1, and the management node may be configured to allocate a reference signal resource to a terminal device served by the set 30 of transceiver points. The network device may alternatively be a control node (not shown) corresponding to a hypercell in FIG. 1, and the control node may be configured to allocate reference signal resources to all terminal devices in the hypercell. In an actual application, the network apparatus 100 may alternatively be another network entity, for example, a management node corresponding to a plurality of sets of transceiver points. This is not limited herein.

Figure 5:
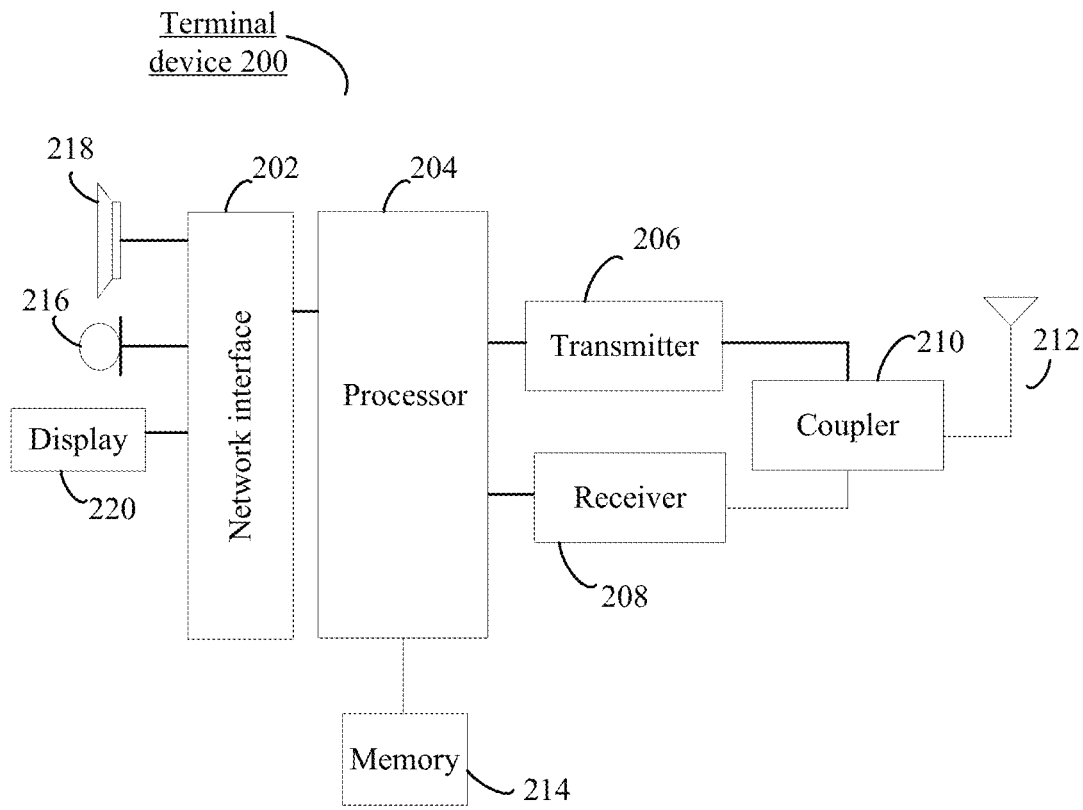
FIG. 5 is a schematic structural diagram of a terminal device according to this application.

Based on a same inventive conception, this application further provides a terminal device. As shown in FIG. 5, the terminal device 200 may include: a network interface 202, a processor 204, a transmitter 206, a receiver 208, a coupler 210, an antenna 212, and a memory 214. The transmitter 206 is configured to send a signal to another communications device (such as a base station), and the receiver 208 is configured to receive a signal sent by another communications device (such as a base station). The coupler 210 is connected to the transmitter 206 and the receiver 208, and may be configured to split a sent signal and a received signal. The antenna 212 is connected to a front end of the coupler 210, and may be configured to transmit an electromagnetic signal to external space or receive an electromagnetic signal from an external environment. The memory 214 is coupled to the processor 204, and is configured to store various software programs and/or a plurality of sets of instructions. In a specific implementation, the memory 214 may include a high-speed random access memory, or may include a non-volatile memory, for example, one or more disk storage devices, flash memory devices, or another non-volatile solid-state storage device.

Optionally, the terminal device 200 may further include some input and output devices, for example, an audio input and output circuit 218, a sensor 216, and a display 220, which may be configured to interact with a user, to receive user input or to output a feedback to the user.

Specifically, the processor 204 in the terminal device 200 may invoke program code stored in the memory 214 to perform the following operations: receiving resource indication information from a network device by using the receiver 208, and determining, based on the resource indication information, a reference signal resource allocated to the terminal device 200. The resource indication information is used to indicate a reference signal resource allocated to the terminal device in a reference signal resource group in which the terminal device is located among a plurality of reference signal resource groups.

In this application, the plurality of reference signal resource groups may be preset. Each resource group includes at least one reference signal resource, and each resource group may be shared by at least one terminal device.

In this application, each reference signal resource group in the plurality of reference signal resource groups may correspond to at least one TRP set, or correspond to at least one TRP. In other words, each resource group is shared by a terminal device served by at least one TRP set (or at least one TRP).

In this application, the reference signal resource may include at least one resource, for example, but not limited to, a time-frequency resource, a port resource, a sequence resource, and a multiplexing code resource that are to be described below.

In an implementation, the resource indication information may include two parts of content: indication information of the reference signal resource group in which the terminal device 200 is located and indication information of the reference signal resource allocated to the terminal device 200. To be specific, the network device may indicate, in a same piece of signaling, both the reference signal resource group in which the terminal device 200 is located and the reference signal resource allocated to the terminal device 200 in the reference signal resource group in which the terminal device 200 is located.

Specifically, the resource indication information may be physical layer indication information, or may be MAC layer indication information, or may be RRC layer indication information, for example, RRC signaling.

In another implementation, the resource indication information may include indication information of the reference signal resource allocated to the terminal device 200. In addition, the processor 204 of the terminal device 200 may further receive, by using the receiver 208, the indication information that is of the reference signal resource group and sent by the network device, and determine, based on the indication information of the reference signal resource group, the resource group in which the terminal device 200 is located. The indication information of the reference signal resource group is used to indicate the reference signal resource group in which the terminal device 200 is located. To be specific, the network device may separately indicate, in two pieces of signaling, the reference signal resource group in which the terminal device 200 is located and the reference signal resource allocated to the terminal device 200 in the reference signal resource group in which the terminal device 200 is located.

Specifically, the resource indication information may be physical layer indication information, or may be MAC layer indication information, or may be RRC layer indication information, for example, RRC signaling. The indication information of the reference signal resource group may be physical layer indication information, or may be MAC layer indication information, or may be RRC layer indication information.

In this application, the processor 204 of the terminal device 200 may further receive, by using the receiver 208, resource configuration information sent by the network device, and determine, based on the resource configuration information, each reference signal resource of each reference signal resource group in the plurality of reference signal resource groups. The resource configuration information may be used to identify each reference signal resource of each reference signal resource group in the plurality of reference signal resource groups.

The resource indication information in this application may be a resource value or a resource index, or a combination of a resource value and a resource index.

It should be noted that for content not mentioned in the embodiment of FIG. 5, refer to the embodiment of FIG. 2 and the foregoing content. Details are not described herein again.

Figure 6:
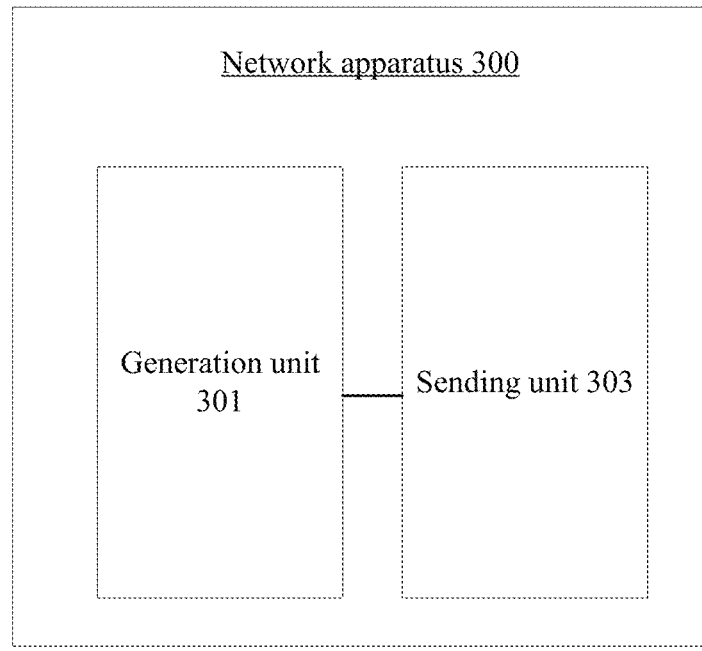
FIG. 6 is a schematic structural diagram of another network apparatus according to this application.

Based on a same inventive conception, this application further provides a network apparatus. The network apparatus is configured to implement the method described in the embodiment of FIG. 2. As shown in FIG. 6, the network apparatus 300 may include: a generation unit 301 and a sending unit 303. The network apparatus 300 may preset a plurality of resource groups for carrying reference signals. Each resource group includes K (K≥1) resources for carrying reference signals, and each resource group may be shared by at least one terminal device.

The generation unit 301 may be configured to generate resource indication information. The resource indication information is used to indicate a reference signal resource allocated to a terminal device in a reference signal resource group in which the terminal device is located among a plurality of reference signal resource groups.

The sending unit 303 may be configured to send the resource indication information to the terminal device.

In this application, in the plurality of reference signal resource groups, each resource group includes at least one reference signal resource, and each resource group may be shared by at least one terminal device.

In this application, each reference signal resource group in the plurality of reference signal resource groups may correspond to at least one TRP set, or correspond to at least one TRP. In other words, each resource group is shared by a terminal device served by at least one TRP set (or at least one TRP).

In this application, the reference signal resource may include at least one resource, for example, but not limited to, a time-frequency resource, a port resource, a sequence resource, and a multiplexing code resource that are to be described below.

The resource indication information in this application may be a resource value or a resource index, or a combination of a resource value and a resource index.

In an implementation, the resource indication information may include two parts of content: indication information of the reference signal resource group in which the terminal device is located and indication information of the reference signal resource allocated to the terminal device.

Specifically, the resource indication information may be physical layer indication information, or may be MAC layer indication information, or may be RRC layer indication information, for example, RRC signaling.

In another implementation, the resource indication information may include indication information of the reference signal resource allocated to the terminal device. In addition, the generation unit 301 may further generate indication information of the reference signal resource group, and the sending unit 303 may further send the indication information of the reference signal resource group to the terminal device. The indication information of the reference signal resource group is used to indicate the reference signal resource group in which the terminal device is located.

Specifically, the resource indication information may be physical layer indication information, or may be MAC layer indication information, or may be RRC layer indication information, for example, RRC signaling. The indication information of the reference signal resource group may be physical layer indication information, or may be MAC layer indication information, or may be RRC layer indication information. In a specific implementation, the sending unit 303 may set a sending sequence of the foregoing two pieces of signaling according to an actual requirement.

In this application, the generation unit 301 may further generate resource configuration information, and the sending unit 303 may further send the resource configuration information to the terminal device. The resource configuration information may be used to identify each reference signal resource of each reference signal resource group in the plurality of reference signal resource groups.

In a specific implementation, the sending unit 303 may send the resource configuration information to the terminal device in, but not limited to, the following manners.

In an implementation, when the terminal device is connected to the network apparatus 300, the sending unit 303 may deliver the resource configuration information to the terminal device.

In another implementation, the sending unit 303 may periodically send the resource configuration information to the terminal device by using static signaling such as RRC signaling, to indicate resources included by the plurality of reference signal resource groups within a relatively long signaling period.

In still another implementation, the sending unit 303 may broadcast the resource configuration information by using a fixed period. A terminal device on which resource configuration has not been performed completes the resource configuration when sensing the broadcast.

In yet another implementation, the network apparatus 300 may be an access network element of a communications network. When the terminal device accesses the communications network, the sending unit 303 may send the resource configuration information to the terminal device.

It should be noted that the sending unit 303 may alternatively deliver the resource configuration information to the terminal device in another manner, for example, by using MAC layer indication information (such as a MAC CE) or physical layer indication information (such as DCI). This is not limited in this application. In addition, a sending occasion and a sending manner of the resource configuration information may further be set according to a specific requirement. The scope of this application is not limited by the foregoing specific examples.

It should be noted that for a specific implementation of each function module in the network apparatus 300, refer to the embodiment of FIG. 2 and the foregoing content. Details are not described herein again.

In an actual application, the network apparatus 300 may be a transceiver point 10 in FIG. 1, and the transceiver point 10 may be configured to allocate a reference signal resource to a terminal device connected to the transceiver point 10. The network device may alternatively be a management node (not shown) corresponding to a set 30 of transceiver points in FIG. 1, and the management node may be configured to allocate a reference signal resource to a terminal device served by the set 30 of transceiver points. The network device may alternatively be a control node (not shown) corresponding to a hypercell in FIG. 1, and the control node may be configured to allocate reference signal resources to all terminal devices in the hypercell. In an actual application, the network apparatus 300 may alternatively be another network entity, for example, a management node corresponding to a plurality of sets of transceiver points. This is not limited herein.

Figure 7:
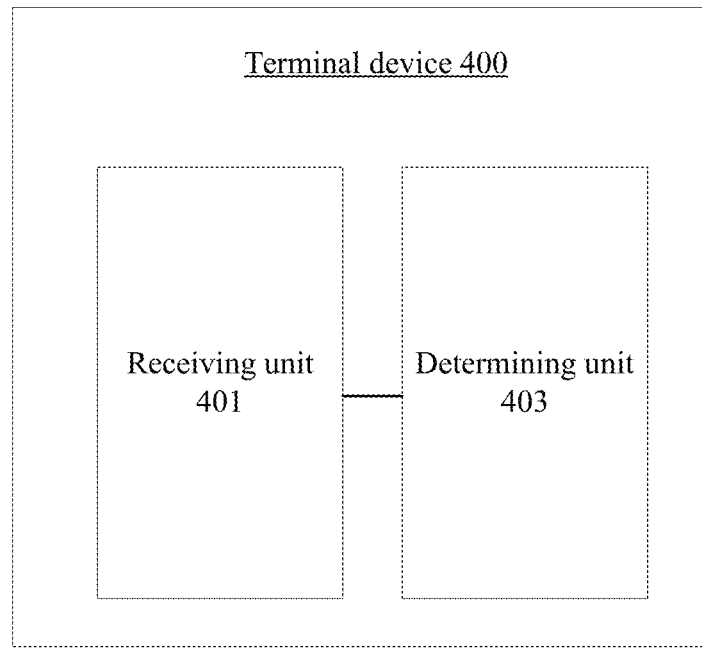
FIG. 7 is a schematic structural diagram of another terminal device according to this application.

Based on a same inventive conception, this application further provides a terminal device. As shown in FIG. 7, the terminal device 400 may include: a receiving unit 401 and a determining unit 403.

The receiving unit 401 may be configured to receive resource indication information. The resource indication information is used to indicate a reference signal resource allocated to the terminal device in a reference signal resource group in which the terminal device is located among a plurality of reference signal resource groups.

The determining unit 403 may be configured to determine, based on the resource indication information, the reference signal resource allocated to the terminal device.

In this application, in the plurality of reference signal resource groups, each resource group includes at least one reference signal resource, and each resource group may be shared by at least one terminal device.

In this application, each reference signal resource group in the plurality of reference signal resource groups may correspond to at least one TRP set, or correspond to at least one TRP. In other words, each resource group is shared by a terminal device served by at least one TRP set (or at least one TRP).

In this application, the reference signal resource may include at least one resource, for example, but not limited to, a time-frequency resource, a port resource, a sequence resource, and a multiplexing code resource that are to be described below.

The resource indication information in this application may be a resource value or a resource index, or a combination of a resource value and a resource index.

In an implementation, the resource indication information may include two parts of content: indication information of the reference signal resource group in which the terminal device 400 is located and indication information of the reference signal resource allocated to the terminal device 400.

In another implementation, the resource indication information may include indication information of the reference signal resource allocated to the terminal device 400. In addition, the receiving unit 401 may further receive indication information that is of the reference signal resource group and sent by a network device. The determining unit 403 may determine, based on the indication information of the reference signal resource group, the resource group in which the terminal device 400 is located.

In this application, the receiving unit 401 may further receive resource configuration information sent by the network device. The determining unit 403 may determine, based on the resource configuration information, each reference signal resource of each reference signal resource group in the plurality of reference signal resource groups. The resource configuration information may be used to identify each reference signal resource of each reference signal resource group in the plurality of reference signal resource groups.

It should be noted that for a specific implementation of each function module in the terminal device 400, refer to the embodiment of FIG. 2 and the foregoing content. Details are not described herein again.

In addition, this application further provides a communications system. The communications system may include a network apparatus and a terminal device. The network apparatus may be configured to: generate resource indication information and send the resource indication information to the terminal device. The resource indication information is used to indicate a reference signal resource allocated to the terminal device in a reference signal resource group in which the terminal device is located among a plurality of reference signal resource groups. The terminal device may be configured to: receive the resource indication information, and determine, based on the resource indication information, the reference signal resource allocated to the terminal device.

In some embodiments, the network apparatus may be the network apparatus 100 described in the embodiment of FIG. 4, and the terminal device may be the terminal device 200 described in the embodiment of FIG. 5. In some embodiments, the network apparatus may alternatively be the network apparatus 300 described in the embodiment of FIG. 6, and the terminal device may alternatively be the terminal device 400 described in the embodiment of FIG. 7. It should be noted that the network apparatus may alternatively be the network device described in all the foregoing content, and the terminal device may be the terminal device described in all the foregoing content.

In conclusion, according to the technical solutions provided in this application, flexibility of configuring the reference signal resource can be improved, so that better resource sharing can be implemented and resource overheads can be reduced. Intra-group or inter-group resources are properly configured, so that inter-user interference may further be reduced, and channel estimation performance is improved.

A person of ordinary skill in the art may understand that all or some of the processes of the methods in the embodiments may be implemented by a computer program instructing related hardware. The program may be stored in a computer readable storage medium. When the program runs, the processes of the methods in the embodiments are performed. The foregoing storage medium includes: any medium that can store program code, such as a ROM, a random access memory RAM, a magnetic disk, or an optical disc.

What is claimed is:

1. A resource indication method, comprising:
generating resource indication information, wherein the resource indication information is used to indicate a reference signal resource allocated to a terminal device in a reference signal resource group in which the terminal device is located among a plurality of reference signal resource groups; and
sending the resource indication information, wherein the plurality of reference signal resource groups comprises a first reference signal resource group and a second reference signal resource group, the first reference signal resource group corresponds to a first transceiver point (TRP) set and the second reference signal resource group corresponds to a second TRP set, each TRP in the first TRP set is a high-frequency TRP and each TRP in the second TRP set is a low-frequency TRP, wherein the reference signal resource includes a time-frequency resource, a port resource, a sequence resource, and a multiplexing code resource.

2. The method according to claim 1, wherein the resource indication information comprises indication information of the reference signal resource group in which the terminal device is located and indication information of the reference signal resource allocated to the terminal device.

3. The method according to claim 1, wherein the resource indication information comprises indication information of the reference signal resource allocated to the terminal device, and the method further comprises:
generating resource group indication information, wherein the resource group indication information is used to indicate the reference signal resource group in which the terminal device is located; and
sending the resource group indication information.

4. The method according to claim 1, wherein the resource indication information comprises at least one of the following: a resource value and a resource index.

5. A resource indication method, comprising:
receiving resource indication information, wherein the resource indication information is used to indicate a reference signal resource allocated to a terminal device in a reference signal resource group in which the terminal device is located among a plurality of reference signal resource groups; and
determining, based on the resource indication information, the reference signal resource allocated to the terminal device, wherein the plurality of reference signal resource groups comprises a first reference signal resource group and a second reference signal resource group, the first reference signal resource group corresponds to a first transceiver point (TRP) set and the second reference signal resource group corresponds to a second TRP set, each TRP in the first TRP set is a high-frequency TRP and each TRP in the second TRP set is a low-frequency TRP, wherein the reference signal resource includes a time-frequency resource, a port resource, a sequence resource, and a multiplexing code resource.

6. The method according to claim 5, wherein the resource indication information comprises indication information of the reference signal resource group in which the terminal device is located and indication information of the reference signal resource allocated to the terminal device.

7. The method according to claim 5, wherein the resource indication information comprises indication information of the reference signal resource allocated to the terminal device;
the method further comprises: receiving resource group indication information, wherein the resource group indication information is used to indicate the reference signal resource group in which the terminal device is located; and
the determining, based on the resource indication information, the reference signal resource allocated to the terminal device specifically comprises: determining, based on the resource group indication information, the resource group in which the terminal device is located, and determining, based on the resource indication information in the resource group in which the terminal device is located, the reference signal resource allocated to the terminal device.

8. The method according to claim 5, further comprising: receiving resource configuration information, wherein the resource configuration information is used to indicate reference signal resources of the plurality of reference signal resource groups; and determining, based on the resource configuration information, the reference signal resources of the plurality of reference signal resource groups.

9. A network apparatus, comprising a processor and a transmitter, wherein
the processor is configured to generate resource indication information, wherein the resource indication information is used to indicate a reference signal resource allocated to a terminal device in a reference signal resource group in which the terminal device is located among a plurality of reference signal resource groups; and
the transmitter, in coordination with the processor, is configured to send the resource indication information, wherein the plurality of reference signal resource groups comprises a first reference signal resource group and a second reference signal resource group, the first reference signal resource group corresponds to a first transceiver point (TRP) set and the second reference signal resource group corresponds to a second TRP set, each TRP in the first TRP set is a high-frequency TRP and each TRP in the second TRP set is a low-frequency TRP, wherein the reference signal resource includes a time-frequency resource, a port resource, a sequence resource, and a multiplexing code resource.

10. The network apparatus according to claim 9, wherein the resource indication information comprises indication information of the reference signal resource group in which the terminal device is located and indication information of the reference signal resource allocated to the terminal device.

11. The network apparatus according to claim 9, wherein the resource indication information comprises indication information of the reference signal resource allocated to the terminal device; the processor is further configured to generate resource group indication information, wherein the resource group indication information is used to indicate the reference signal resource group in which the terminal device is located; and the transmitter is further configured to send the resource group indication information.

12. The network apparatus according to claim 9, wherein the processor is further configured to generate resource configuration information, wherein the resource configuration information is used to indicate reference signal resources of the plurality of reference signal resource groups; and the transmitter is further configured to send the resource configuration information.

13. A terminal device, comprising a receiver and a processor, wherein
the receiver, in coordination with the processor, is configured to receive resource indication information, wherein the resource indication information is used to indicate a reference signal resource allocated to the terminal device in a reference signal resource group in which the terminal device is located among a plurality of reference signal resource groups; and
the processor is configured to determine, based on the resource indication information, the reference signal resource allocated to the terminal device, wherein the plurality of reference signal resource groups comprises a first reference signal resource group and a second reference signal resource group, the first reference signal resource group corresponds to a first transceiver point (TRP) set and the second reference signal resource group corresponds to a second TRP set, each TRP in the first TRP set is a high-frequency TRP and each TRP in the second TRP set is a low-frequency TRP, wherein the reference signal resource includes a time-frequency resource, a port resource, a sequence resource, and a multiplexing code resource.

14. The terminal device according to claim 13, wherein the resource indication information comprises indication information of the reference signal resource group in which the terminal device is located and indication information of the reference signal resource allocated to the terminal device.

15. The terminal device according to claim 13, wherein the resource indication information comprises indication information of the reference signal resource allocated to the terminal device; the receiver is further configured to receive resource group indication information, wherein the resource group indication information is used to indicate the reference signal resource group in which the terminal device is located; and the processor is specifically configured to determine, based on the resource group indication information, the resource group in which the terminal device is located, and determine, based on the resource indication information in the resource group in which the terminal device is located, the reference signal resource allocated to the terminal device.

16. The terminal device according to claim 13, wherein the receiver is further configured to receive resource configuration information, wherein the resource configuration information is used to indicate reference signal resources of the plurality of reference signal resource groups; and the processor is further configured to determine, based on the resource configuration information, the reference signal resources of the plurality of reference signal resource groups.

17. A network apparatus, comprising:
a processor;
a non-transitory memory, configured to store at least one computer instructions which, when executed by the processor, cause the processor to perform the following operations:
generating resource indication information, wherein the resource indication information is used to indicate a reference signal resource allocated to a terminal device in a reference signal resource group in which the terminal device is located among a plurality of reference signal resource groups; and sending the resource indication information, wherein the plurality of reference signal resource groups comprises a first reference signal resource group and a second reference signal resource group, the first reference signal resource group corresponds to a first transceiver point (TRP) set and the second reference signal resource group corresponds to a second TRP set, each TRP in the first TRP set is a high-frequency TRP and each TRP in the second TRP set is a low-frequency TRP, wherein the reference signal resource includes a time-frequency resource, a port resource, a sequence resource, and a multiplexing code resource.

18. The network apparatus according to claim 17, wherein the resource indication information comprises indication information of the reference signal resource group in which the terminal device is located and indication information of the reference signal resource allocated to the terminal device.

19. A terminal device, comprising:
a processor; and
a non-transitory memory, configured to store at least one computer instructions which, when executed by the processor, cause the processor to perform following operations:
receiving resource indication information, wherein the resource indication information is used to indicate a reference signal resource allocated to the terminal device in a reference signal resource group in which the terminal device is located among a plurality of reference signal resource groups; and
determining, based on the resource indication information, the reference signal resource allocated to the terminal device, wherein the plurality of reference signal resource groups comprises a first reference signal resource group and a second reference signal resource group, the first reference signal resource group corresponds to a first transceiver point (TRP) set and the second reference signal resource group corresponds to a second TRP set, each TRP in the first TRP set is a high-frequency TRP and each TRP in the second TRP set is a low-frequency TRP, wherein the reference signal resource includes a time-frequency resource, a port resource, a sequence resource, and a multiplexing code resource.

* * * * *